United States Patent
Asada

(10) Patent No.: US 7,064,866 B1
(45) Date of Patent: Jun. 20, 2006

(54) IMAGE FORMING APPARATUS SELECTIVELY APPLYING A SMOOTHING OPERATION TO IMAGE DATA

(75) Inventor: Kenichiroh Asada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 859 days.

(21) Appl. No.: 09/640,068

(22) Filed: Aug. 17, 2000

(30) Foreign Application Priority Data

| Aug. 19, 1999 | (JP) | ................................. 11-232812 |
| Feb. 8, 2000 | (JP) | ............................ 2000-030790 |
| Jun. 15, 2000 | (JP) | ............................ 2000-180327 |

(51) Int. Cl.
  *G06K 15/00* (2006.01)
  *H04N 1/40* (2006.01)
  *H04N 1/407* (2006.01)
  *H04N 1/409* (2006.01)

(52) U.S. Cl. ..................... 358/2.1; 358/3.21; 358/3.26; 358/3.27

(58) Field of Classification Search .................. 358/1.9, 358/3.26, 3.27, 447, 2.9, 529, 2.1, 3.08, 3.21, 358/3.24; 382/266, 269, 270
See application file for complete search history.

(56) References Cited

U.S. PATENT DOCUMENTS

| 5,084,762 | A | * | 1/1992 | Miyakawa | ................... | 358/529 |
| 5,245,445 | A | * | 9/1993 | Fujisawa | ................... | 358/3.15 |
| 5,457,546 | A | * | 10/1995 | Hong | ........................ | 358/447 |
| 5,553,200 | A | * | 9/1996 | Accad | ........................ | 358/1.9 |
| 5,754,708 | A | * | 5/1998 | Hayashi et al. | ............. | 382/266 |
| 5,892,852 | A | * | 4/1999 | Namizuka et al. | .......... | 382/254 |
| 5,920,646 | A | * | 7/1999 | Kamon | ....................... | 382/173 |
| 6,181,438 | B1 | * | 1/2001 | Bracco et al. | ............... | 358/1.9 |
| 6,195,473 | B1 | * | 2/2001 | Zable et al. | ................ | 382/299 |

FOREIGN PATENT DOCUMENTS

| EP | 0 768 792 | 4/1997 |
| EP | 0 862 319 | 9/1998 |
| JP | 8-223229 | 8/1996 |
| JP | 9-102870 | 4/1997 |
| JP | 9-130628 | 5/1997 |
| JP | 2000-092327 | 3/2000 |

* cited by examiner

*Primary Examiner*—David Moore
*Assistant Examiner*—James A. Thompson
(74) *Attorney, Agent, or Firm*—Oblon, Spivak, Maier & Neustadt, P.C.

(57) ABSTRACT

An image forming apparatus can apply a smoothing process to multiple value image data without generation of errors due to an unnecessary smoothing process. A template matching process unit determines whether or not the original image data is to be subjected to a smoothing process, and outputs the original image data together with a selection signal indicative of a result of the determination. A smoothing process unit selectively applies a smoothing process to the original image data based on the determination of the template matching process unit so as to output smoothed image data. A first control signal source outputs a first control signal representing whether or not application of the smoothing process is permitted on an individual image basis. A second control signal source outputs a second control signal representing whether or not application of the smoothing process is permitted on an individual pixel basis. A selector selects one of the original image data and the smoothed image data base on the selection signal, the first control signal and the second control signal supplied thereto.

24 Claims, 13 Drawing Sheets

IMAGE FORMING APPARATUS SELECTIVELY APPLYING A SMOOTHING OPERATION TO IMAGE DATA

BACKGROUND OF THE INVENTION

1. Field of the Invention

The present invention generally relates to image forming apparatuses and, more particularly, to an image forming apparatus, such as a printer, a digital copy machine, a facsimile machine, an optical filing machine or an electronic sorting apparatus, which has a multiple value print engine performing a smoothing operation for removing jaggy portions of an image.

2. Description of the Related Art

Conventionally, there is known an image output device of a digital copy machine provided with a facsimile function. Such an image output device has a multiple value print engine and a frame memory having a multiple value structure so that an image can be represented according to 1 bit/dot, 2 bits/dot or 8 bits/dot by selecting options.

FIG. 1 is a block diagram of a conventional binary image smoothing process circuit. In FIG. 1, the binary image smoothing process circuit comprises a line buffer 100, a template matching process unit 200, a smoothing process unit 300 and a dividing-smoothing process unit 400. The line buffer 100 is a memory for storing binary image data corresponding to a plurality of lines. The line buffer 100 supplies image data, which corresponds to n (dots)×m (lines) matrix pixel data having a center pixel to be processed, to the template matching process unit 200. The template matching process unit 200 compares the n×m matrix pixel data with previously stored template data for smoothing. The result of the comparison is supplied to the smoothing process unit 300. The smoothing process unit 300 transforms the center pixel of the matrix pixel data, which matches the template data for smoothing, to enlarged smoothing pixels consisting of j (dots)×k (dots). The dividing-smoothing process unit 400 applies a dividing-smoothing process to the j×k enlarged smoothing pixels based on a predetermined enlarging ratio so as to convert the j×k enlarged smoothing pixels into the smoothing-processed multiple value data.

Regarding the input binary image data corresponding to a picture or a photograph, which requires gradation representation, the image data is normally supplied to a print engine after a gradation process such as a Dither process or an error diffusion process is applied. On the other hand, the image data corresponding to characters is supplied to the print engine without being subjected to the gradation process since the character image requires sharpness to increase the character recognition rate. The above-mentioned processes are applied to the image data when the image data is subjected to the raster image development in the controller.

The smoothing process circuit shown in FIG. 1 is used to apply the multiple value smoothing process to the binary image data. FIG. 2 is a block diagram of a smoothing process circuit, which processes multiple value image data. The smoothing process circuit shown in FIG. 2 is provided with a line buffer 101 instead of the line buffer 100 shown in FIG. 1. The line buffer 101 stores multiple value image data corresponding to a plurality of lines. Additionally, the smoothing process circuit shown in FIG. 2 is provided with a multiple value smoothing process unit 201, which processes the multiple value image data supplied from the line buffer 101. The multiple value image data is processed by the smoothing process unit 300 and the dividing-smoothing process unit 400 in the same manner as that of the smoothing process circuit shown in FIG. 1.

However, in the above-mentioned structure of the multiple value smoothing circuit, the capacity of the line buffer 101 and the template matching process unit 201 must be increased due to the number of bits representing the multiple values. In order to reduce the capacity of the line buffer and the template matching process unit, there is suggested a multiple value smoothing process circuit shown in FIG. 3.

FIG. 3 is a block diagram of the multiple value smoothing process circuit 600. The multiple value smoothing process circuit 600 has the same structure as the smoothing process circuit shown in FIG. 1 except for a determination block 110 and the selector 500 being added thereto. The determination block 110 is provided before the line buffer 100 so as to determine whether the input multiple value image data is a full intensity pixel. The selector 500 is provided after the dividing-smoothing process unit 400 so as to select one of the input image data and the smoothed data output from the dividing-smoothing process unit 400.

More specifically, when the multiple value image data shown in FIG. 4A including full intensity pixels, 50% intensity pixels and zero intensity pixels is supplied to the multiple value smoothing process circuit 600, the determination block 110 supplies the image data to the line buffer 100 by adding a true value=1 only to each of the full intensity pixels. The template matching process unit 200 applies the template matching process only to the full intensity pixels provided with the true value=1. The thus-processed pixels are subjected to a multiple value smoothing process for binary image by the smoothing process unit 300 and the dividing-smoothing process unit 400. The selector 500 selects and outputs only the thus-processed pixels. Other pixels including the 50% intensity pixels and the zero intensity pixels that are not rendered to be the true value=1 by the determination block 110 are selected by the selector 500, and are output without being subjected to the smoothing process.

The above-mentioned smoothing processes are disclosed in Japanese Laid-Open Patent Applications No. 9-130628 and No. 9-102870.

The multiple value image data may include a character image or a frame image having jaggy portions. Accordingly, if the multiple value smoothing process is applied only to the binary image data, the multiple value image data is not subjected to the smoothing process. As a result there is still a problem in that the jaggy portions remain in the character image or the frame image represented by the multiple value image data.

On the other hand, many multiple value color images include a halftone image part such as a photographic image and a character image part. Thus, if the same smoothing process is applied to the image data corresponding to an entire sheet or page, the smoothing process to be applied to the character image is also applied to the halftone image. That is, if the halftone image part contains a pixel arrangement which matches the template data, the pixel in the pixel arrangement is subjected to the smoothing process to be applied to the character image. This results in deterioration in the degradation of the halftone image part. Additionally, a false contour which does not exist in the original image may be created in the output image. Further, there is a case in which a smoothing operation is preferably applied only to the black character image or a case in which the intensity of the smoothing process is preferably changed according to a color of the image to be processed.

SUMMARY OF THE INVENTION

It is a general object of the present invention to provide an improved and useful image forming apparatus in which the above-mentioned problems are eliminated.

A more specific object of the present invention is to provide an image forming apparatus which can prevent a gradation in the image represented by multiple value image data from being deteriorated due to an unnecessary smoothing process being applied to a halftone image included in the image.

In order to achieve the above-mentioned objects, there is provided according to the present invention an image forming apparatus comprising: a print engine forming a visible image from image data supplied thereto; a controller receiving original image data from an external image data source and supplying the image data to the print engine; and a smoothing unit provided between the controller and the print engine. The smoothing unit comprises: a template matching process unit which determines whether or not the original image data is to be subjected to the smoothing process by comparing the original image data with template data, and outputs the original image data together with a selection signal indicative of a result of the determination of the template matching process unit; a smoothing process unit which selectively applies a smoothing process to the original image data based on the determination of the template matching process unit so as to output smoothed image data; a first control signal source outputting a first control signal representing whether or not application of the smoothing process is permitted on an individual image basis; a second control signal source outputting a second control signal representing whether or not application of the smoothing process is permitted on an individual pixel basis; and a selector selecting one of the original image data and the smoothed image data base on the selection signal, the first control signal and the second control signal supplied thereto.

According to the above-mentioned invention, the original image data and the smoothed image data can be selectively output from the smoothing unit to the print engine on an individual image basis such as a character image, a picture image or a photographic image in accordance with the first control signal representing whether or not application of the smoothing process is permitted on an individual image basis. Additionally, the second control signal can prohibit the selection of the smoothed image data on an individual pixel basis even if the smoothed image data is selected by the first control signal. Accordingly, if a character image containing a picture image is supplied and the smoothed image data is selected for the character image, the original image corresponding to the character image which is not smoothed can be selected by the second control signal. Thus, the picture image can be prevented from being deteriorated due to an unnecessary smoothing process being applied to the picture image which generates gradation errors.

In the image forming apparatus according to the present invention, the smoothing unit may include a register for storing the register address and data so that the first and second control signal sources are provided in the register. In this case, there is no need to provide a separate signal line for the first and second control signal.

Alternatively, in the image forming apparatus according to the present invention, the smoothing unit may include a register which provides the first control signal source, and the second control signal source may be provided in the controller so as to directly supply the second control signal to the selector without routing the register. Since the second control signal is changed on an individual pixel basis, a high-speed change can be achieved by directly supplying the second control signal to the selector from an external unit via an independent signal line.

Additionally, when the original image data is multiple image data, the smoothing unit may include a binary process unit which converts the multiple value image data to binary image data so that the smoothing process is applied to the binary image data. On the other hand, when the original image data is binary image data, the smoothing unit may include a binary to multiple value conversion unit which converts the binary image data to multiple value image data.

Additionally, in the present invention, when the original image data is color image data, the smoothing process may be applied to the original image data on an individual color basis.

Other objects, features and advantages of the present invention will become more apparent from the following detailed description when read in conjunction with the accompanying drawings.

DETAILED DESCRIPTION OF THE DRAWINGS

DETAILED DESCRIPTION OF THE PREFERRED EMBODIMENTS

A description will now be given of an image forming apparatus to which the present invention is applicable.

Figure 1:
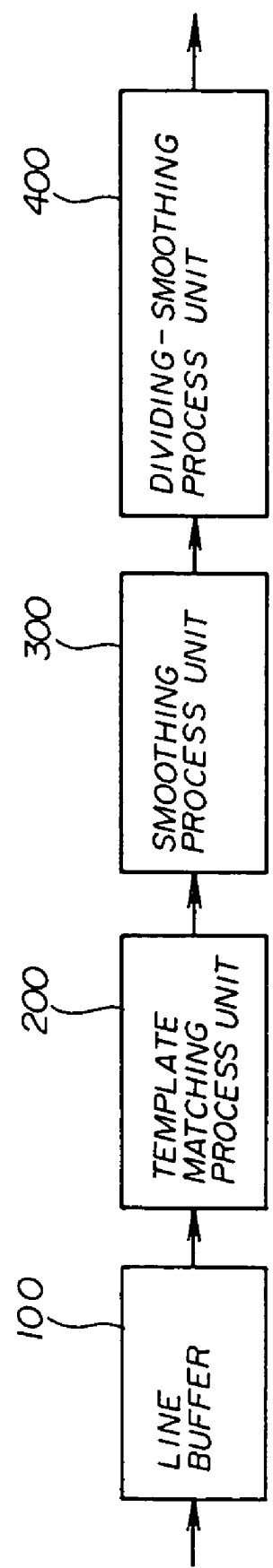
FIG. 1 is a block diagram of a conventional binary image smoothing process circuit, which processes binary image data.
Figure 2:
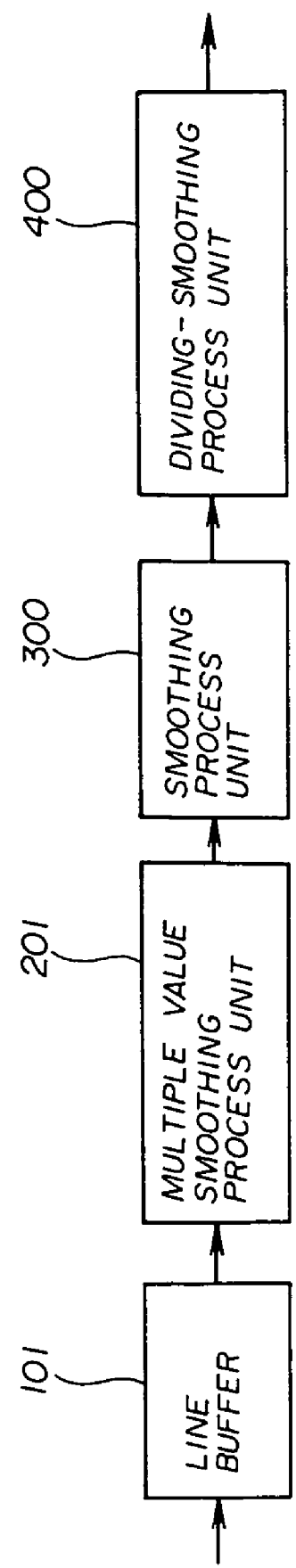
FIG. 2 is a block diagram of a conventional multiple value image smoothing process circuit, which processes multiple value image data.
Figure 3:
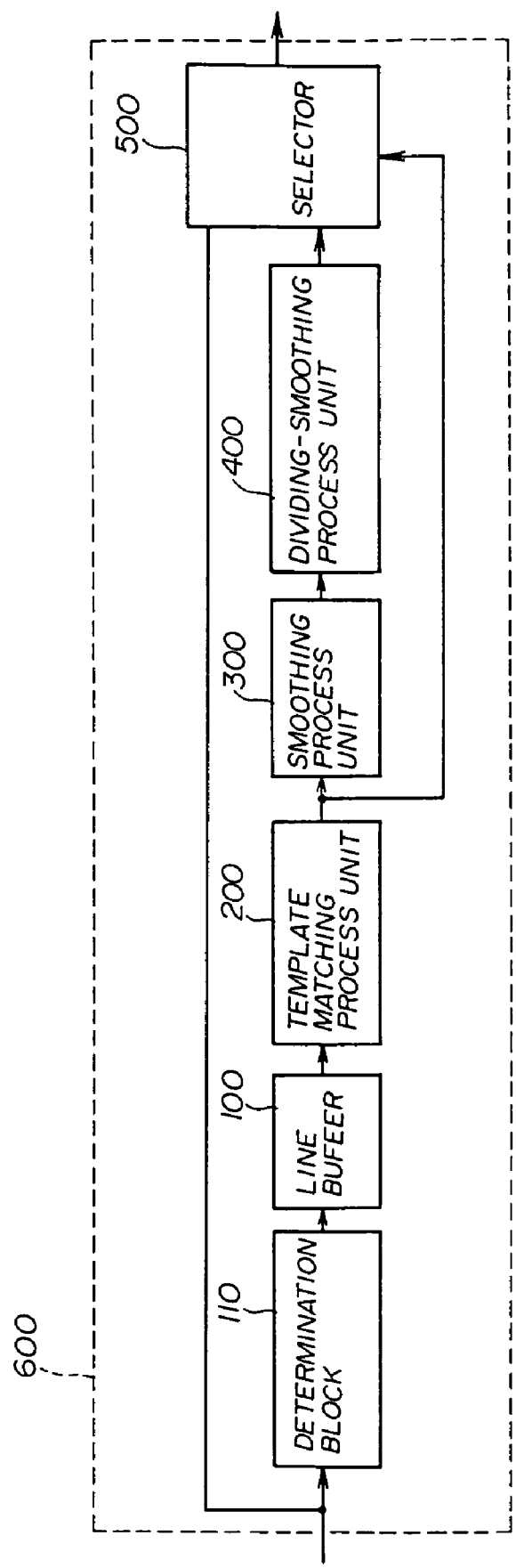
FIG. 3 is a block diagram of another conventional multiple value image smoothing process circuit.
Figure 4:
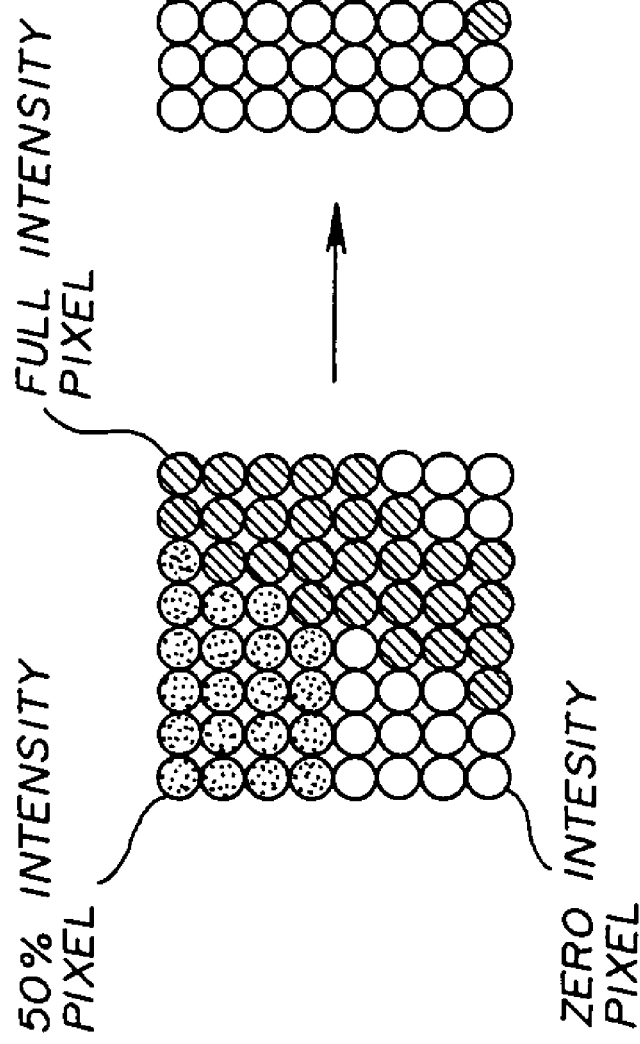
FIG. 4A is an illustration of pixels contained in multiple value image data.
FIG. 4B is an illustration of pixels processed by a determination block shown in FIG. 3.
Figure 5:
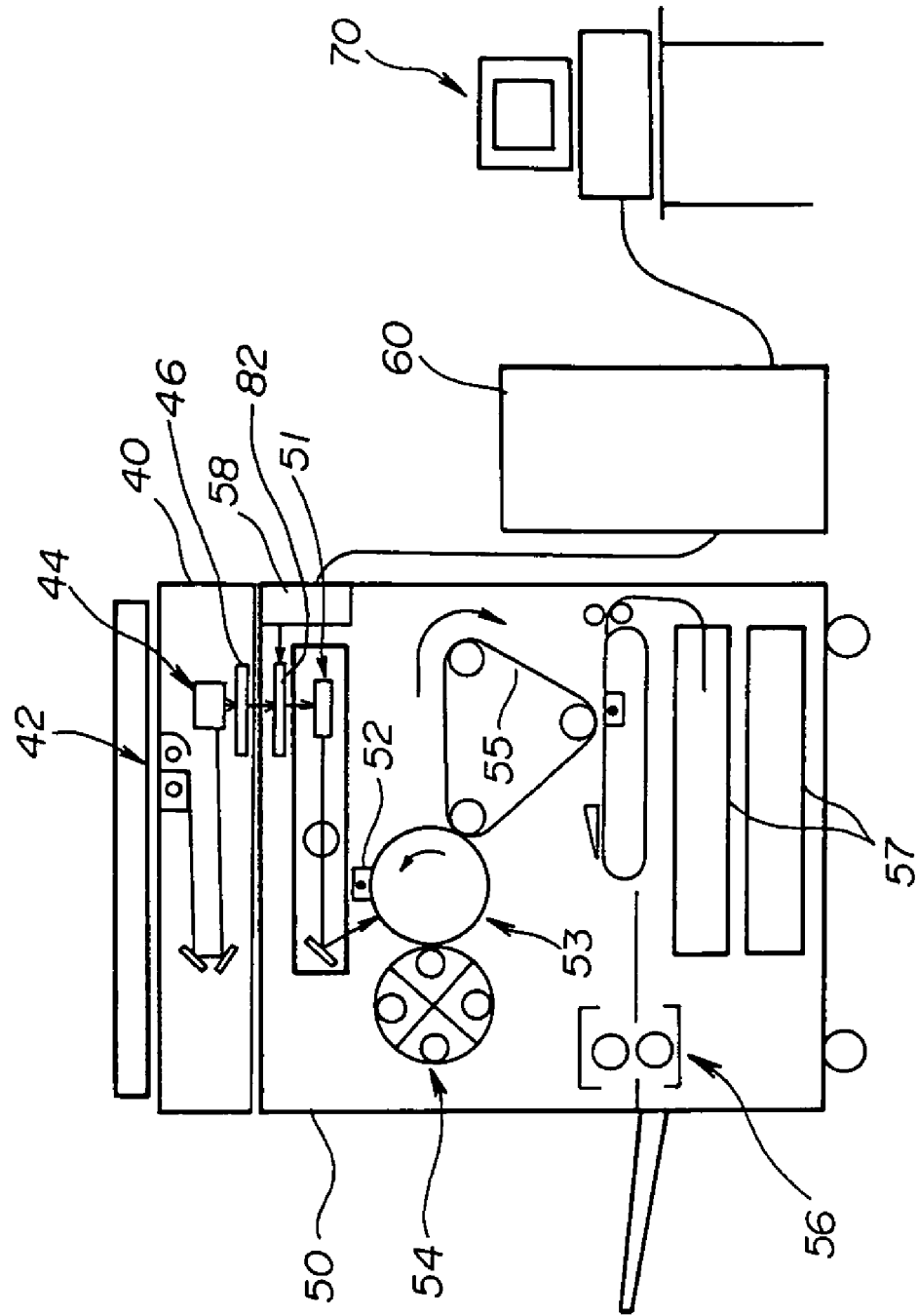
FIG. 5 is an illustration of the entire structure of a digital copy machine to which the present invention is applied.

FIG. 5 is an illustration of the entire structure of a digital copy machine to which the present invention is applied. As shown in FIG. 5, the digital copy machine comprises a scanner unit 40, a main unit 50 and a controller 60. The scanner unit 40 is attached to a top of the main unit 50 so as to supply image data obtained by scanning to the main unit 50. The controller 60 is connected to the main unit 50 so as to receive image data together with command data supplied from an external apparatus such as a personal computer 70. The image data and the command data are processed by the controller 60, and are supplied to the processed image data to the main unit 50.

The scanner unit 40 optically scans an original document placed on a contact glass by a scanner 42. The optical signal generated by the scanner 42 is read by a CCD unit 44. The analog image data generated by the CCD unit 44 is converted into digital image data by an image processing circuit 46. The image processing circuit 46 also applies a color control process and a gradation control process to the digital image data. Then, the digital image data is supplied from the scanner unit 40 to the main unit 50.

The main unit 50 comprises a polygon mirror 51, an electric charge unit 52, a photoconductive drum unit 53, a development unit 54, an intermediate transfer unit 55, a fixing unit 56, a paper feed unit 57 and a main unit control unit 58. The digital image data output from the main unit 40 is supplied to a write control unit 82 first, and, then, the digital image data is supplied to the polygon mirror 51. The operation of each unit in the main unit 50 is known in the art, and descriptions thereof will be omitted. It should be noted that the operation of each unit in the main unit 50 is controlled by the main unit control unit 58. The abovementioned main unit 50 of the digital copy machine which performs a printing operation is generally referred to as a print engine.

The digital copy machine can also output a visible image from image data supplied by the personal computer 70. The image data supplied by the personal computer 70 is received by the controller 60. Since the image data supplied by the personal computer 70 may output image data having various data formats, the controller 60 interprets the data format of the image data supplied by the personal computer 70 so as to apply an appropriate color correction and gradation control process that match the characteristic of the print engine of the digital copy machine. The controller 60 develops the processed image data to a bit-map image data, and transfers the bit-map image data to the main unit control unit 58 of the main unit 50.

Figure 6:
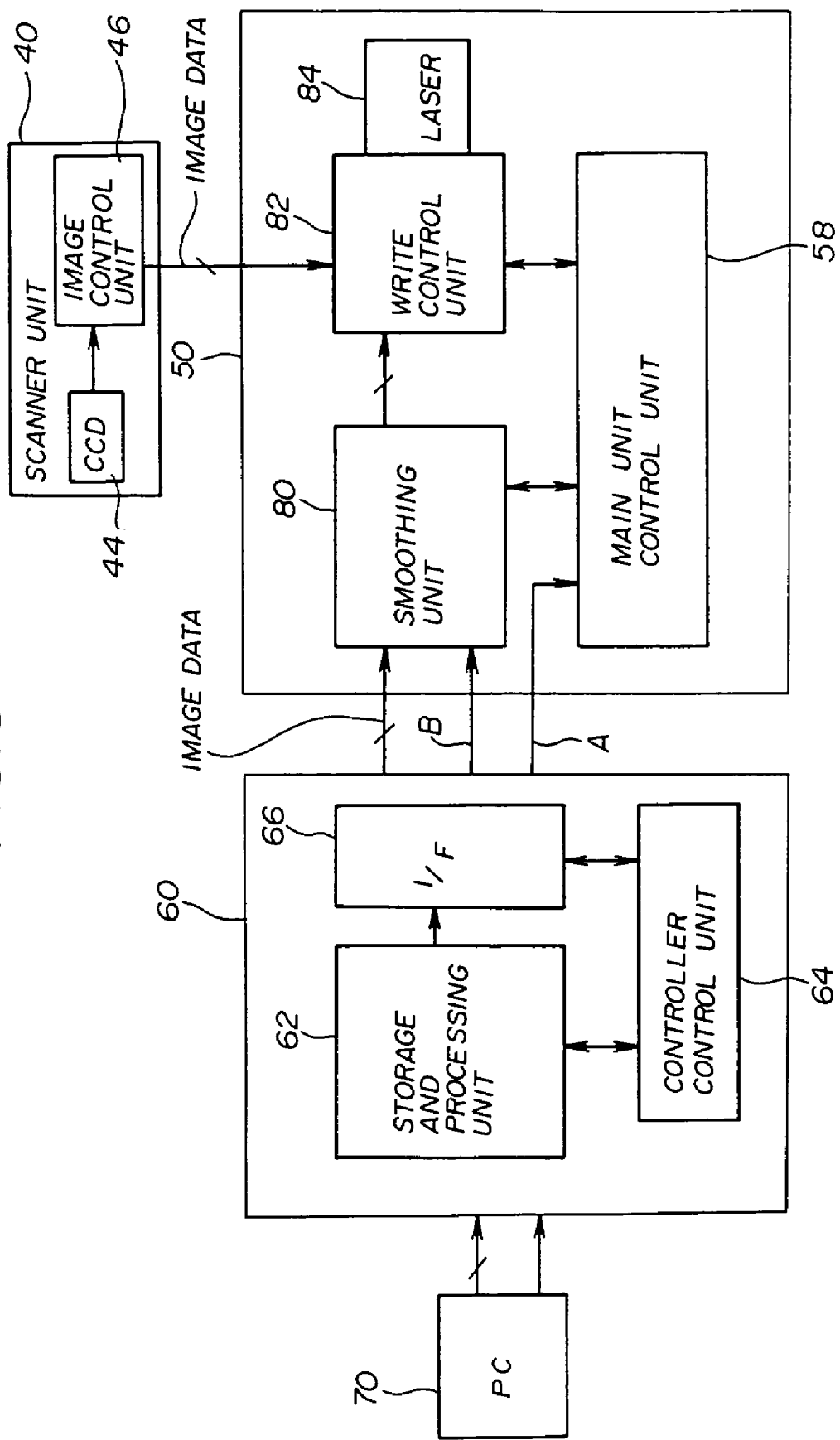
FIG. 6 is a block diagram of a controller and a main unit shown in FIG. 5.

FIG. 6 is a block diagram of the controller 60 and the main unit control unit 58 for explaining the stream of the image data. The image data supplied from the personal computer 70 to the controller 60 is transferred to a storage and processing unit 62. The storage and processing unit 62 stores the supplied image data in a memory unit such as a hard disc. The storage and processing unit 62 then develops the image data to the bit-map image data, and temporarily stores the bit-map image data in a memory such as a DRAM. When the image data is developed to the bit-map image data, a color correction process and a gradation control process are also applied to the image data. Additionally, as described later, a flag is attached to the bit-map image data, which flag indicates whether the image data corresponds to a character image or a picture image.

The bit-map image data is then supplied to a smoothing unit 80 provided in the main unit 50 via an interface unit 66. The image data is subjected to a smoothing process by the smoothing unit 80, and the smoothed image data is transferred to a write control process unit 82. The write control process unit 82 controls a semiconductor laser 84 to scan a laser beam on the photoconductive drum 53 in synchronization with operations of other units in the main unit 50.

When the image data is supplied to the smoothing unit 80, the controller 60 also supplies a control signal A and a control signal B.

The control signal A is supplied to the main unit control unit 58 so as to provide information regarding the status of the controller 60 to the main unit 50. The control signal A is also used to provide information regarding the image size to be output, the color of the image and a recording paper to be used. The control signal B is used to control the smoothing unit 80 as described later. Since the control signal B is supplied from the controller 60 to the smoothing unit 80 via an independent line, the control signal B is suitable for controlling an operation of the smoothing unit 80 which operation requires a quick response.

Figure 7:
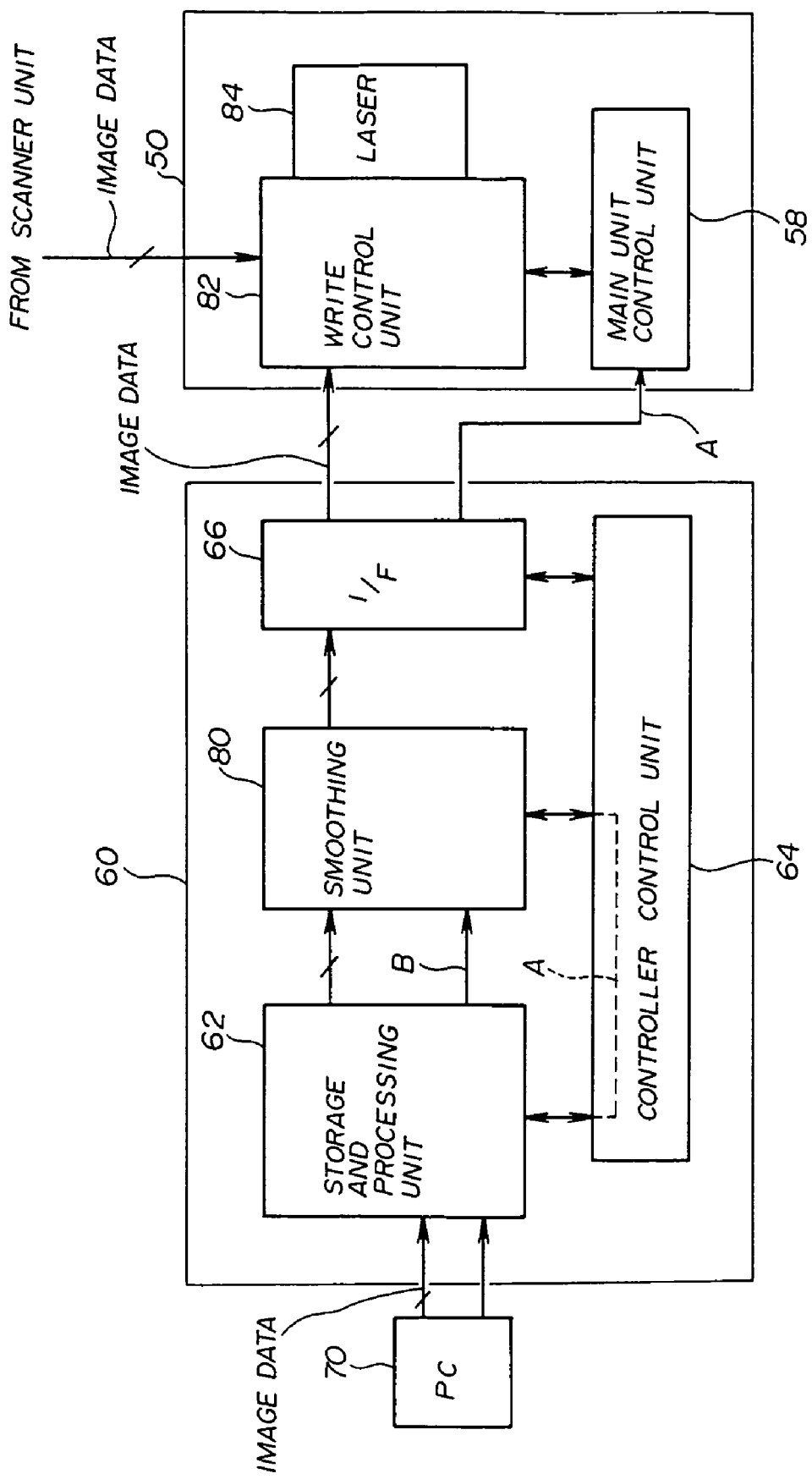
FIG. 7 is a block diagram of a variation of the controller and the main unit show in FIG. 5.

Although the smoothing unit 80 is provided in the main unit 50 as shown in FIG. 6, the smoothing unit 80 may be provided in the controller 60 as shown in FIG. 7. That is, the smoothing unit 80 may be provided in any location between the storage and processing unit 62 of the controller 60 and the write control unit 82 of the main unit 50.

It should be noted that the image data output from the scanner unit 40 is directly supplied to the write control unit 82. The write control unit 82 has a data selector to select one of the image data from the controller 60 and the image data from the scanner unit 40.

Figure 8:
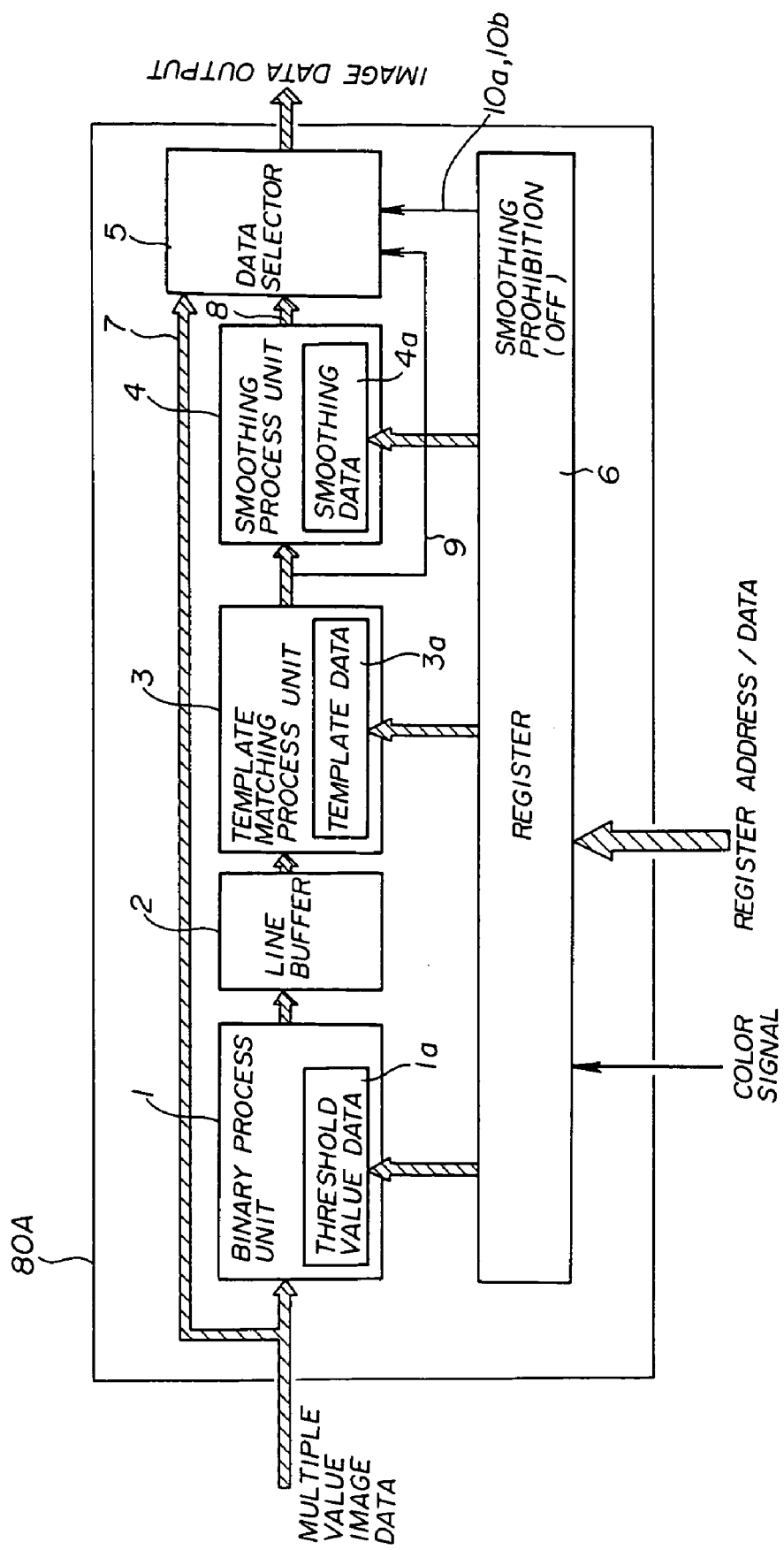
FIG. 8 is a block diagram of a smoothing unit provided in an image forming apparatus according to a first embodiment of the present invention.
Figure 9:
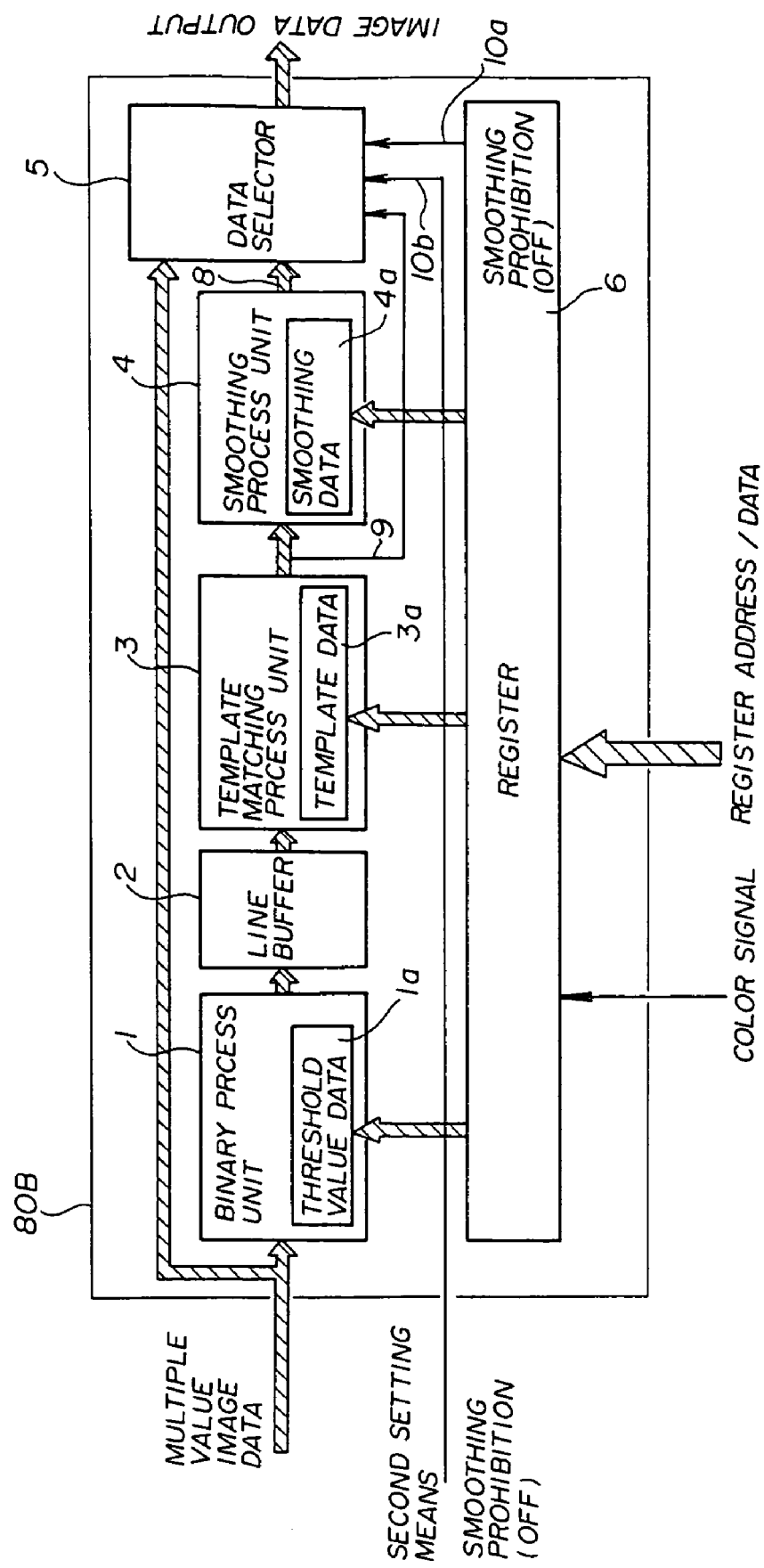
FIG. 9 is a block diagram of a smoothing unit provided in an image forming apparatus according to a second embodiment of the present invention.

A description will now be given, with reference to FIGS. 8 and 9, of an image forming apparatuses according to first embodiment and second embodiments of the present invention. FIG. 8 is a block diagram of a smoothing unit 80A provided in the image processing apparatus according to the first embodiment of the present invention. FIG. 9 is a block diagram of a smoothing unit 80B provided in the image processing apparatus according to the second embodiment of the present invention. The smoothing unit 8A shown in FIG. 8 has basically the same structure as the smoothing unit 8B shown in FIG. 9.

Each of the smoothing unit 80A shown in FIG. 8 and the smoothing unit 80B shown in FIG. 9 comprises a binary process unit 1, a line buffer 2, a template matching process unit 3, a smoothing process unit 4, a data selector 5 and a register 6.

In the smoothing unit 80A shown in FIG. 8, the register 6 can store first smoothing prohibition data indicating whether or not a smoothing process is permitted to be applied to the image data on an individual image basis. The first smoothing prohibition data is set in the register 6 by the control signal A supplied from the controller 60. When the smoothing process is permitted on an individual image basis, the first smoothing prohibition data indicates "ON". When the smoothing process is not permitted on an individual image basis, the first smoothing prohibition data indicates "OFF". A first control signal 10a representing the ON/OFF state of the first smoothing prohibition data is supplied to the data selector 5.

The register 6 can also store second smoothing prohibition data indicating whether or not a smoothing process is permitted to be applied to the image data on an individual pixel basis. The second smoothing prohibition data is set in the register 6 by the control signal B supplied from the controller 60. When the smoothing process is permitted on an individual pixel basis, the second smoothing prohibition data indicates "ON". When the smoothing process is not permitted on an individual pixel basis, the second smoothing prohibition data indicates "OFF". A second control signal 10b representing the ON/OFF state of the second smoothing prohibition data is supplied to the data selector 5.

When both the first smoothing prohibition data and the second smoothing prohibition data in the register indicate "OFF", the data selector 5 selects unsmoothed image data. Otherwise, the data selector 5 selects smoothed image data output from the smoothing process unit 4.

In the smoothing unit 80B shown in FIG. 9, the second smoothing prohibition data is not set in the register 6 but is supplied from the controller 60 shown in FIG. 6. That is, the control signal B directly supplied to the smoothing unit 80B indicates the ON/OFF status of the second smoothing prohibition data. The data selector 5 selects one of the smoothed image data and the unsmoothed image data in accordance with the first and second smoothing prohibition data.

The smoothing unit 80A shown in FIG. 8 is effective for a case in which the switching operation of the data selector 5 can be at a relatively low speed. That is, the smoothing unit 80A is appropriate for the slow switching between the smoothed image data and the unsmoothed image data. This is because the first and second smoothing prohibition data are supplied through an address/data line connected to the register 6.

On the other hand, the smoothing unit 80B shown in FIG. 9 has an advantage that the switching between the smoothed image data and the unsmoothed image data can be made on an individual dot (pixel) basis. However, the smoothing unit 80B requires an exclusive ON/OFF switching signal line for sending the control signal B representing the ON/OFF status of the second smoothing prohibition data.

In the smoothing units 80A and 80B, an inexpensive controller which does not have means for setting the second smoothing prohibition data can be used by originally setting the first smoothing prohibition data to the register 6 to be "ON" and the second smoothing prohibition data to be "OFF". Additionally, each of the threshold value data 1$a$ of the binary process unit 1, the template data 3$a$ of the template matching process unit 3 and the smoothing data 4$a$ of the smoothing process unit 4 may not be set to a constant value, and may be represented by rewritable table information.

It should be noted that, in FIG. 8, the second smoothing prohibition data is set in the register 6. Thus, the register 6 of the smoothing unit shown in FIG. 8 corresponds to means for setting both the first and second smoothing prohibition data.

A description will now be given of an operation of the smoothing units 80A and 80B.

Normally, a color image comprises four color planes such as Yellow, Magenta, Cyan and Black. Thus, the multiple value smoothing process for multiple value image data can be applied to each of the four colors. Since the object of the smoothing process (a jaggy portion correcting process) to be applied is mainly image data having a high intensity, the multiple value image data 7 (for example, represented by 8 bits) is binarized by the binary process unit 1 so as to extract a character image and a line or frame image from the multiple value image data 7. At this time, the multiple value image data 7 is compared with the threshold value data 1$a$ in the binary process unit 1, and the pixel data having a value greater than the threshold value is extracted.

The binarized image data is temporarily stored in the line buffer 2. Then, it is determined by the template matching process unit 3 whether or not n×m matrix pixels including and surrounding the pixel to be processed is to be subjected to the smoothing process. The result 9 of the determination made by the template matching process unit 3 is supplied to the smoothing process unit 4 and the data selector 5. Thus, the smoothing process unit 4 replaces the pixel data to be smoothed by interpolated and corrected multiple value data 8 in accordance with the smoothing data 4$a$, and supplies the interpolated and corrected multiple value data 8 to the data selector 5.

The data selector 5 is provided with the interpolated and corrected multiple value data 8 and the original multiple value image data 7. The data selector 5 selects and outputs one of the interpolated and corrected multiple value data 8 and the original multiple value image data 7. That is, the data selector 5 selects and outputs the interpolated and corrected multiple value data 8 when both the first and second control signals 10$a$ and 10$b$ represent that the smoothing is not prohibited (ON state) and when the pixel to be processed is determined to be subjected to the smoothing process. On the other hand, when it is determined by the template matching process unit 3 that the pixel data to be processed does not correspond to the pixel data to be smoothed, the data selector 5 selects and outputs the original multiple value image data 7.

It should be noted that there is a case in which a further smoothed image can be obtained by changing the level of extraction of the pixel data to be smoothed according to the γ-characteristic of the print engine or some kinds of multiple value image data. For example, when a monochrome printer such as a facsimile machine is used, an improved output image (character image) can be obtained by setting the level of extraction of the character area by changing the threshold value data 1$a$.

In the case of a color image data, undesired color changes can be reduced by reducing errors caused by a smoothing process. This can be achieved by lowering the threshold value data 1$a$ with respect to black image data so as to more easily extract the black character image, and setting the threshold value data to a higher value (for example, FF(H) for 8-bits multiple value image) with respect to other colors.

Even if the threshold value data is changed for each color, errors cannot be completely eliminated. In the color image data, the object to be smoothed is a character image, and there are many cases in which it is undesirable to apply the smoothing process to other image areas. Additionally, there are many cases in which the color of the character image is black. Accordingly, the deterioration in the image quality due to the smoothing error with respect to the color image data can be reduced by selecting the smoothed data when the black image data is supplied and selecting the original image data (unsmoothed data) when image data of other colors is supplied. Such an operation can be achieved by effecting the smoothing operation of the process unit 4 and selectively outputting the smoothed data by the data selector 5.

Additionally, there is a case in which a gradation control process such as the Dither process or the area gradation process is applied to the multiple value image data such as photographic image data. In such a case, an optimum extraction of the pixel data to be smoothed can be achieved with respect to the data subjected to the gradation process by changing the template data 3$a$ in the template matching process unit 3 from the data for a normal image data to the data for the image data subjected to the Dither process or the area gradation process. In the case of a color image, there are many cases in which the gradation process is changed for each color. Thus, data optimized for each color can be used as the template data 3$a$. A further smoothed character image can be achieved by optimizing the smoothing data 4$a$ together with the template data 3$a$.

In the structure shown in FIG. 8, ON/OFF of the smoothing operation can be switched for each color by supplying a color signal to the register 6. On the other hand, in the structure shown in FIG. 9, ON/OFF of the smoothing operation can be switched at a frequency greater than that of the color change. In the smoothing unit 80B shown in FIG. 9, the second control signal 10b (second setting means) representing the ON/OFF status of the second smoothing prohibition data is supplied separately from the first control signal 10a (first setting means) representing the ON/OFF status of the first smoothing prohibition data so that the second control signal 10b can be supplied to the data selector 5 at an image data rate (individual pixel rate). Accordingly, even when the black image data is supplied, the first control signal 10a can be set ON (smoothing process is permitted) with respect to the character image area and the second control signal 10b can be set OFF (smoothing process is prohibited).

Figure 10:
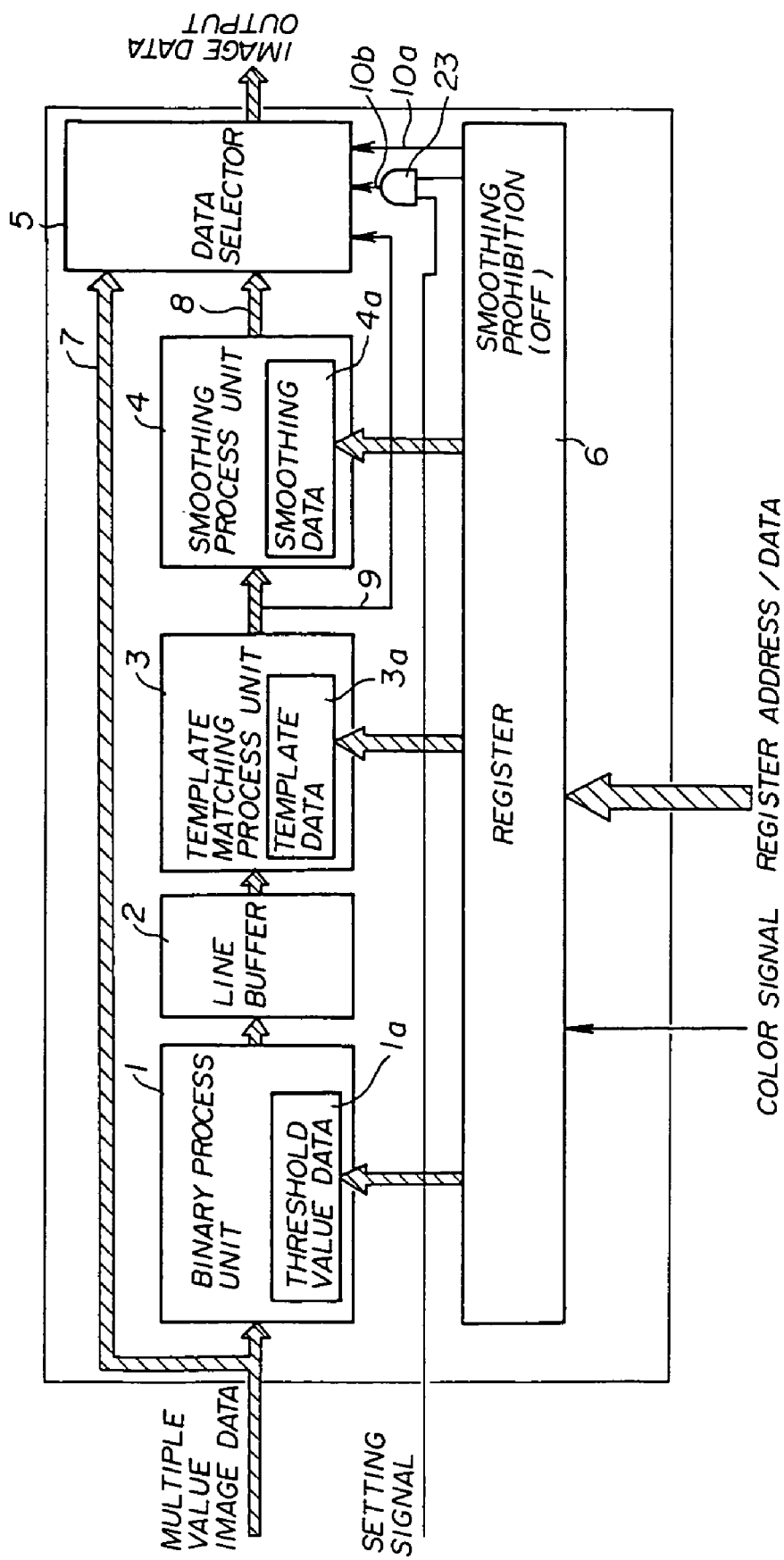
FIG. 10 is a block diagram of a smoothing unit, which is a variation of the smoothing unit shown in FIG. 8.

It should be noted that, in FIG. 9, the second control signal 10b is supplied from the controller 60. Alternatively, the second smoothing prohibition data may be set in the register 6 as shown in FIG. 8 and an AND gate 23 may be provided as shown in FIG. 10 so as to perform an AND operation with respect to the second control signal 10b and a setting signal supplied from the controller 60 so that the smoothing process based on an individual pixel basis can be prohibited by effecting the second control signal 10b output from the register 6 only when the setting signal is supplied from the controller 60. Additionally, the first control signal 10a may be supplied from an external unit such as the controller 60.

The smoothing data 4a is supplied as table information which can instruct the change in the image data for each color. In this case, although the size of the table information can be small, the table information must be changed during the changeover of colors which is not appropriate for a high-speed printer. The table information can be provided for each of the colors Y, M, C and K so as to change the table information by the color signal. In such a case, the size of the table becomes large, but there is no need to change the table information during a short period to change colors. Accordingly, the change of the tale information does not affect the image forming speed. The advantage of the change of the table information for each color can be achieved for other table information. It should be noted that the waiting time related to the change of the table information can be substantially eliminated if the change of the table information is performed during a startup period after the main power of the image forming apparatus is turned on.

Figure 11:
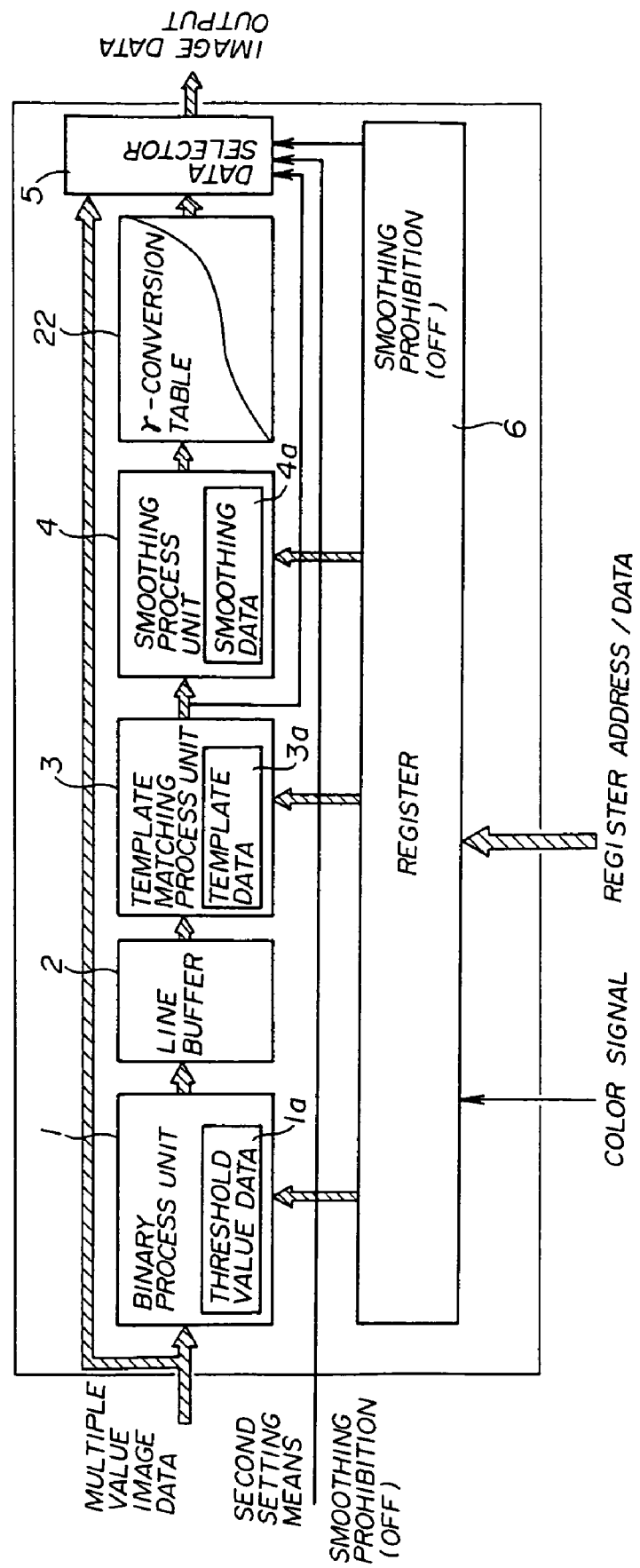
FIG. 11 is a block diagram of a smoothing unit, which is a variation of the smoothing unit shown in FIG. 9.

In the above-mentioned embodiments, the smoothed image data output from the smoothing process unit 4 is directly supplied to the data selector 5. However, as shown in FIG. 11, a γ-conversion unit 22 storing a γ-conversion table can be provided between the smoothing process unit 4 and the data selector 5 so as to correct the image data to match the γ-characteristic of the print engine. The γ-conversion table may be rewritable by the register 6 in accordance with the color of the image and the characteristic of the image data so that an accuracy of the correction applied to the image data can be further improved.

Additionally, although the threshold value data 1a, the template data 3a and the smoothing data 4a are stored in the binary process unit 1, the template matching process unit 3 and the smoothing process unit 4, respectively, the threshold value data 1a, the template data 3a and the smoothing data 4a may be stored in the register 6 so that the binary process unit 1, the template matching process unit 3 and the smoothing process unit 4 can refer to the data stored in the register 6 when it is needed.

Figure 12:
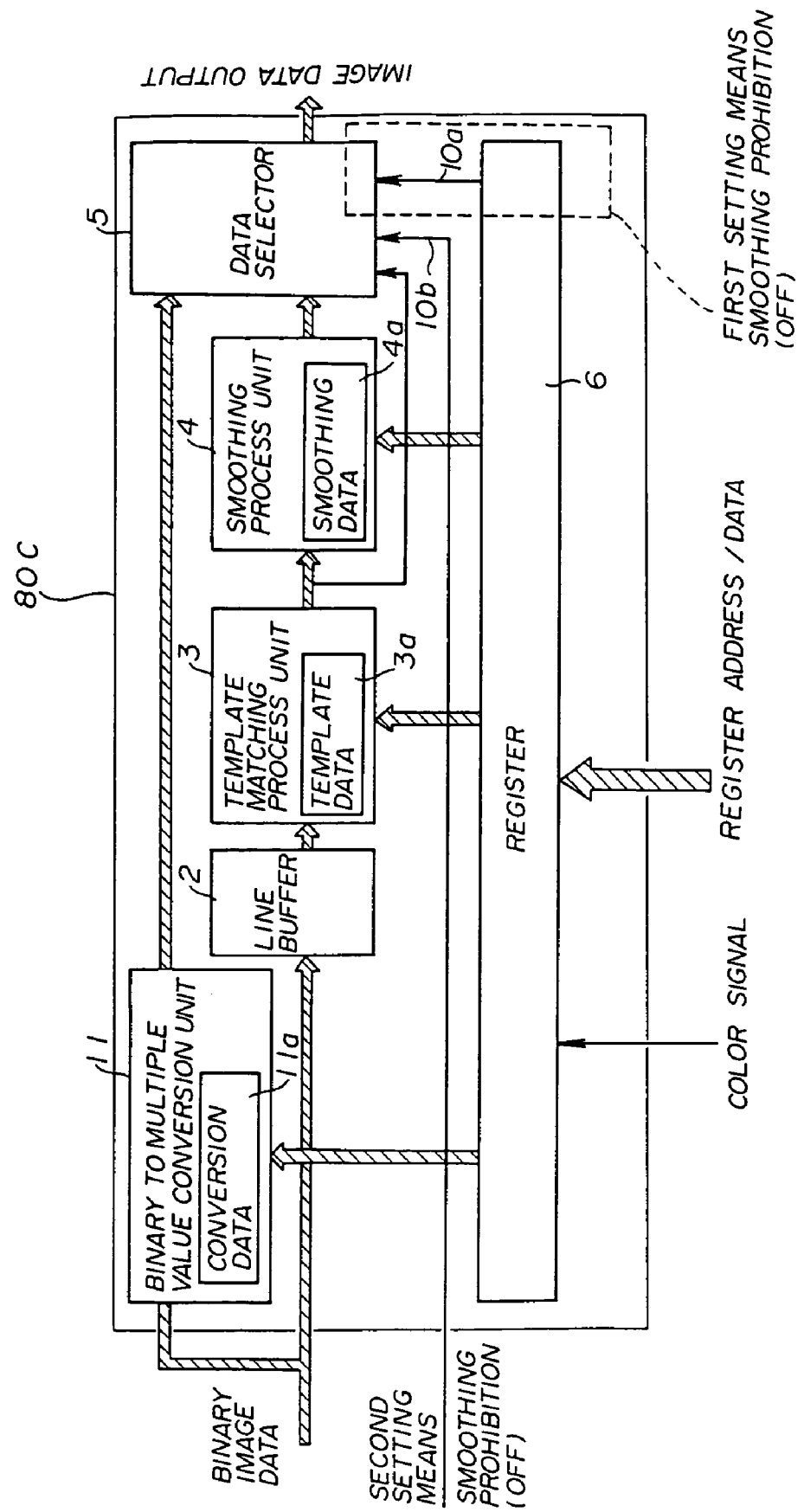
FIG. 12 is a block diagram of a smoothing unit provided in an image forming apparatus according to a third embodiment of the present invention.

A description will now be given, with reference to FIG. 12, of a third embodiment of the present invention. FIG. 12 is a block diagram of a smoothing unit 80C provided in an image forming apparatus according to the third embodiment of the present invention. In FIG. 12, parts that are the same as the parts shown in FIG. 8 are given the same reference numerals, and descriptions thereof will be omitted.

The smoothing unit 80C does not process the multiple value image data but processes the binary image data. Accordingly, the smoothing unit 80C does not have the binary process unit 1 shown in FIG. 8, which converts multiple value image data into binary image data. Instead, the smoothing unit 80C has a binary to multiple value conversion unit 11 which converts binary image data into multiple value image data. The binary to multiple value conversion unit 11 produces multiple value image data which matches the characteristic of the print engine which can output an image having multiple value gradation. The binary to multiple value conversion unit 11 converts the binary image data into the multiple value image data by interpolation.

The image data converted by the binary to multiple value conversion unit 11 comprises single-bit data which takes either a value "0" or "1". If the binary image data is processed by a print engine which can output 8-bit image data (up to 256 gradation levels per single dot), the binary image data must be converted into 8-bit data having gradation levels from "00" to "FF". In order to do this, the value "1" of the binary image data is converted into "FF" or "F0" of the 8-bit data in accordance with the output intensity of the print engine or user's preference. Such a binary to multiple value conversion is performed in accordance with conversion data 11a stored in the binary to multiple value conversion unit 11.

It should be noted that the binary to multiple value conversion can be achieved by a conventional technique such as disclosed in Japanese Laid-Open Patent Application No. 8-223229, and detailed description thereof will be omitted. Additionally, if the binary image data is color image data, the smoothing process is performed for each color.

In the smoothing unit 80C according to the third embodiment of the present invention, the binary image data is supplied to both the binary to multiple value conversion unit 11 and the line buffer 2. The binary image data supplied to the line buffer 2 is processed in the same manner as that of the smoothing unit 80B shown in FIG. 9, and the smoothed data is supplied to the data selector 5. On the other hand, the binary image data supplied to the binary to multiple value conversion unit 11 is converted into the multiple value image data as mentioned above, and the multiple value image data is supplied to the data selector 5. Since the smoothed data output from the smoothing process unit 4 is multiple value image data and the image data output from the binary to multiple value conversion unit 11 is also multiple value image data, the image data selected and output from the data selector can always be multiple value image data.

As shown in FIG. 12, the smoothing unit 80C has the first setting means and second setting means similar to the smoothing unit 80B shown in FIG. 9. That is, the first control signal 10a is supplied to the data selector 5 from the register 6, and the second control signal 10b is supplied from an external signal source (controller 60) to the data selector 5. Accordingly, the smoothing unit 80C can provide the same advantages as the smoothing unit 80B shown in FIG. 9 with respect to the permission or prohibition of the smoothing process provided by the first and second control signals.

Additionally, similar to the above-mentioned smoothing units 80A and 80B, the smoothing unit 80C can also perform the smoothing process for each color since the color signal is supplied thereto. Further, the γ-conversion unit 22 may be provided between the smoothing process unit 4 and the data selector 5 as shown in FIG. 11. Additionally, the conversion data 11a may be stored in the register 6 instead of the binary to multiple value conversion unit 11 so that the binary to multiple value conversion unit 11 can refer to the conversion table 11a in the register 6 when it is needed.

It should be noted that although the second control signal 10b is supplied from the external unit (controller 60), the second control signal 10b may be supplied from the register 6 as is in the same manner as the smoothing unit 80A shown in FIG. 8.

Figure 13:
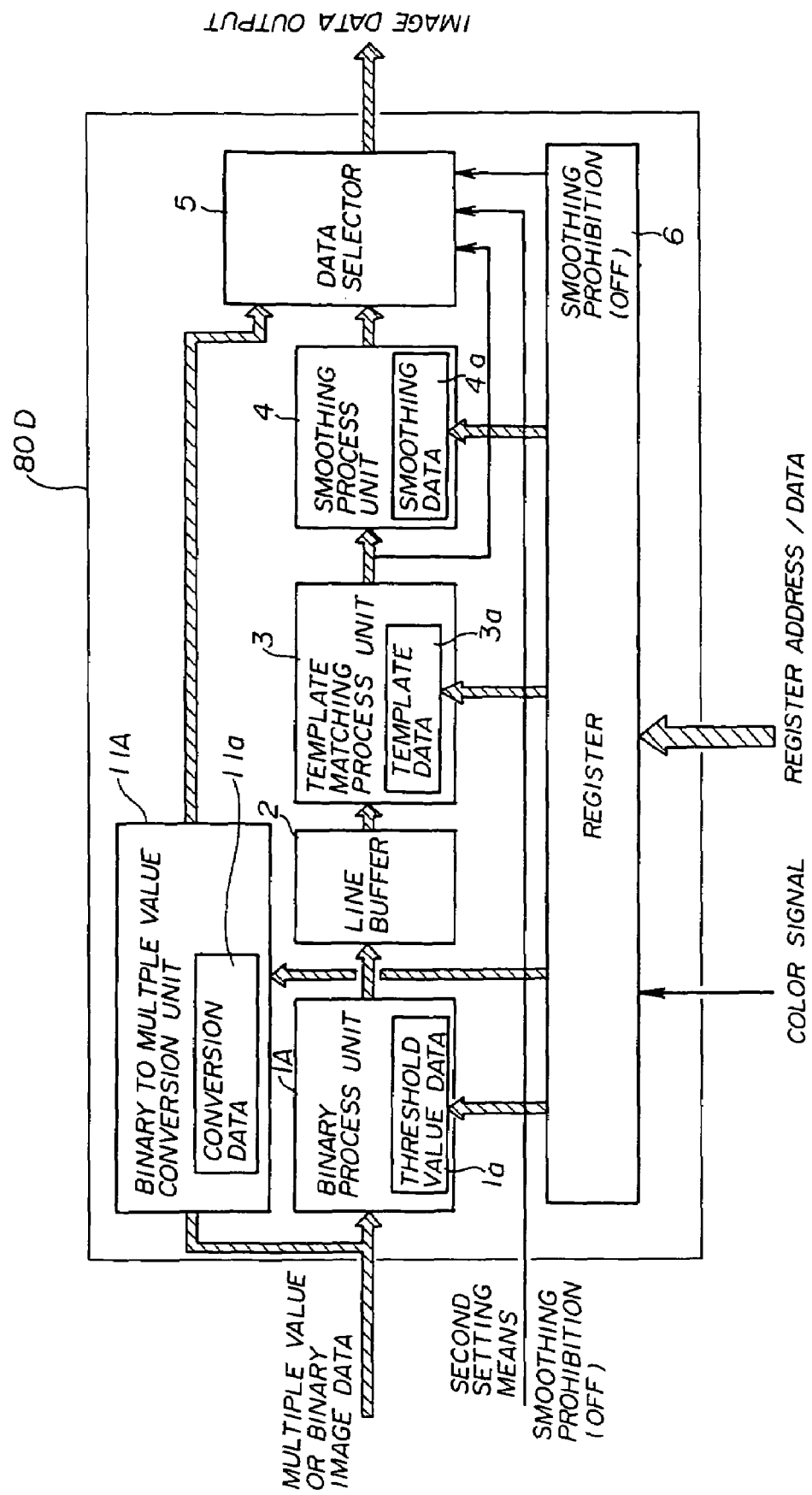
FIG. 13 is a block diagram of a smoothing unit provided in an image forming apparatus according to a fourth embodiment of the present invention.

A description will now be given, with reference to FIG. 13, of a fourth embodiment of the present invention. FIG. 13 is a block diagram of a smoothing unit 80D provided in an image forming apparatus according to the fourth embodiment of the present invention. In FIG. 13, parts that are the same as the parts shown in FIG. 9 are given the same reference numerals, and descriptions thereof will be omitted.

The smoothing unit 80D of the image forming apparatus according to the fourth embodiment of the present invention is configured to process the image data including both the binary image data and the multiple value image data. As shown in FIG. 13, the smoothing unit 80D includes both a binary process unit 1A and a binary to multiple value conversion unit 11A.

When the original image data is multiple value image data, the binary process unit 1A converts the multiple value image data into binary image data, and supplies the binary image data to the line buffer 2. When the original image data is binary image data, the binary process unit 1A passes through the binary image data to the line buffer 2.

On the other hand, when the original image data is multiple value image data, the binary to multiple value conversion unit 11A passes through the multiple value image data to the data selector 5. When the original image data is binary image data, the binary to multiple value conversion unit 11A converts the binary image data into multiple value image data, and supplies the multiple value image data to the data selector 5.

Other structures and operations of the smoothing unit 80D are the same as that of the smoothing unit 80B shown in FIG. 9. Thus, the effects and advantages of the smoothing unit 80B can also be achieved by the smoothing unit 80D.

That is, as shown in FIG. 12, the smoothing unit 80C has the first setting means and second setting means similar to the smoothing unit 80B shown in FIG. 9. The first control signal 10a is supplied to the data selector 5 from the register 6, and the second control signal 10b is supplied from an external signal source (controller 60) to the data selector 5. Accordingly, the smoothing unit BOD can provide the same advantages as the smoothing unit 80B shown in FIG. 9 with respect to the permission or prohibition of the smoothing process provided by the first and second control signals 10a and 10b.

Additionally, similar to the above-mentioned smoothing units 80A, 80B and 80C, the smoothing unit 80D can also perform the smoothing process for each color since the color signal is supplied thereto. Further, the γ-conversion unit 22 may be provided between the smoothing process unit 4 and the data selector 5 as shown in FIG. 11. Additionally, the conversion data 11a may be stored in the register 6 instead of the binary to multiple value conversion unit 11A so that the binary to multiple value conversion unit 11A can refer to the conversion table 11a in the register 6 when it is needed.

It should be noted that although the second control signal 10b is supplied from the external unit (controller 60), the second control signal 10b may be supplied from the register 6 as is in the same manner as the smoothing unit 80A shown in FIG. 8.

The present invention is not limited to the specifically disclosed embodiments, and variations and modifications may be made without departing from the scope of the present invention.

The present application is based on Japanese priority applications No. 11-232812 filed Aug. 19, 1999, No. 2000-030790 filed Feb. 8, 2000 and No. 12-180327, the entire contents of which are hereby incorporated by reference.

What is claimed is:

1. An image forming apparatus comprising:
    a print engine forming a visible image by image data supplied thereto;
    a controller receiving original image data from an external image-data source and supplying the image data to said print engine, the original image data being a multiple value image data; and
    a smoothing unit provided between said controller and said print engine, said smoothing unit comprising:
        a binary process unit configured to binarize the original image data;
        a template matching process unit configured to determine whether or not the original image data is to be subjected to a smoothing process by comparing the original image data with a template data, and to output the original image data together with a selection signal indicative of a result of the determination of said template matching process unit;
        a smoothing process unit configured to selectively apply the smoothing process to the original image data based on the determination of said template matching process unit so as to output a smoothed image data; and
        a selector configured to select one of the original image data received by the controller and one of the smoothed image data based on the selection signal,
    wherein said binary process unit binarizes the original image data by comparing the original image data with a threshold value data which is externally changeable,
    wherein the original image data is a color image data, and the threshold value data is set on an individual color basis, and
    wherein the color image data includes a set of data for each of a plurality of colors, and a threshold value with respect to black is set lower than a threshold values of other colors.

2. The image forming apparatus as claimed in claim 1, wherein the original image data includes a binary image data and the multiple value image data, and said smoothing unit further comprises:
    a binary to multiple value conversion unit,
    wherein said binary process unit is configured to supply the binarized original image data to said template matching process, and said binary to multiple value conversion unit is configured to convert the original image data into a multiple value original image data and to supply the multiple value original image data to said selector.

3. The image forming apparatus as claimed in claim 1, wherein the template data of said template matching process unit is changeable externally.

4. The image forming apparatus as claimed in claim 1, wherein said smoothing process unit applies the smoothing process based on a smoothing data which is externally changeable.

5. The image forming apparatus as claimed in claim 4, wherein the original image data is a color image data, and the smoothing data is set on an individual color basis.

6. The image forming apparatus as claimed in claim 5, wherein the smoothing data comprises a table information which is set on an individual color basis.

7. The image forming apparatus as claimed in claim 1, wherein the original image data is a color image data, and the template data is set on an individual color basis.

8. The image forming apparatus as claimed in claim 1, wherein said smoothing unit further comprises:
 a γ-conversion unit configured to apply a γ-conversion process to the smoothed image data from the smoothing process unit, the γ-conversion process being applied in accordance with a γ-conversion data.

9. The image forming apparatus as claimed in claim 8, wherein the γ-conversion data is changeable externally.

10. The image forming apparatus as claimed in claim 9, wherein the original image data is a color image data, and the γ-conversion data is set on an individual color basis.

11. The image forming apparatus as claimed in claim 1, wherein said smoothing unit further comprises:
 a register configured to store the template data used by said template matching process unit.

12. The image forming apparatus as claimed in claim 11, wherein said register is further configured to store a threshold value data and a smoothing data, the threshold value data being used to binarize the original image data by comparing the original image data with the threshold value data, the smoothing data being used to apply the smoothing process to the original image data.

13. An image forming apparatus according to claim 1, wherein said smoothing unit further comprises:
 a first control signal source configured to output a first control signal representing whether or not application of the smoothing process is permitted on an individual image basis; and
 a second control signal source configured to ouput a second control signal representing whether or not application of the smoothing process is permitted on an individual pixel basis.

14. The image forming apparatus as claimed in claim 13 wherein said smoothing unit further comprises:
 a register so that the first and second control signal sources are provided in said register.

15. The image forming apparatus as claimed in claim 13 wherein said smoothing unit further comprises:
 a register so that the first control signal source is provided in the register, and the second control signal source is provided in said controller so that the second control signal is directly supplied to said selector without routing said register.

16. The image forming apparatus as claimed in claim 13, wherein the second control signal is effected so as to prohibit the smoothing process only when the smoothing process is permitted on an individual image basis by the first control signal.

17. The image forming apparatus as claimed in claim 13, wherein the original image data is a color image data, and the first control signal represents whether or not application of the smoothing process is permitted on an individual color basis.

18. The image forming apparatus as claimed in claim 17, wherein the second control signal is effected so as to prohibit the smoothing process only when the smoothing process is permitted on an individual color basis by the first control signal.

19. The image forming apparatus as claimed in claim 13, wherein the second control signal source outputs the second control signal based on whether or not a gradation control process is applied to the smoothed image data.

20. The image forming apparatus as claimed in claim 19, wherein the gradation control process is one of a Dither process and a gradation area process.

21. A controller configured to receive an original image data from an external image-data source and configured to supply an image data to a print engine, said controller comprising:
 a storage and processing unit configured to apply a predetermined process to the original image data and to output a processed original image data, the original image data being a multiple value image data; and
 a smoothing unit configured to apply a smoothing process to the original image data output from said storage and processing unit; said smoothing unit comprising:
 a binary process unit configured to binarize the original image data;
 a template matching process unit configured to determine whether or not the original image data output from said storage and processing unit is to be subjected to a smoothing process by comparing the original image data with a template data, and to output the original image data together with a selection signal indicative of a result of the determination of said template matching process unit;
 a smoothing process unit configured to selectively apply the smoothing process to the original image data based on the determination of said template matching process unit so as to output a smoothed image data; and
 a selector configured to select one of the original image data received by the controller and one of the smoothed image data based on the selection signal,
 wherein said binary process unit binarizes the original image data by comparing the original image data with a threshold value data which is externally changeable,
 wherein the original image data is a color image data, and the threshold value data is set on an individual color basis, and
 wherein the color image data includes a set of data for each of a plurality of colors, and a threshold value with respect to black is set lower than a threshold values of other colors.

22. The image forming apparatus as claimed in claim 21, wherein said smoothing unit further comprises:
 a register configured to store the template data used by said template matching process unit.

23. The image forming apparatus as claimed in claim 22, wherein said register is further configured to store a threshold value data and a smoothing data, the threshold value data being used to binarize the original image data by comparing the original image data with the threshold value data, the smoothing data being used to apply the smoothing process to the original image data.

24. The image forming apparatus as claimed in claim 23, wherein at least one of the first and second control signal sources is provided in said register.

* * * * *